US 11,348,200 B2

(12) United States Patent
Suitoh et al.

(10) Patent No.: US 11,348,200 B2
(45) Date of Patent: May 31, 2022

(54) INFORMATION PROCESSING APPARATUS FOR CORRECTING A ZENITH OF A SPHERICAL IMAGE, INFORMATION PROCESSING METHOD, AND NON-TRANSITORY COMPUTER-READABLE RECORDING MEDIUM

(71) Applicants: Hiroshi Suitoh, Kanagawa (JP); Makoto Odamaki, Kanagawa (JP)

(72) Inventors: Hiroshi Suitoh, Kanagawa (JP); Makoto Odamaki, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/997,181

(22) Filed: Aug. 19, 2020

(65) Prior Publication Data
US 2021/0090210 A1    Mar. 25, 2021

(30) Foreign Application Priority Data

Sep. 20, 2019  (JP) .............................. JP2019-171489

(51) Int. Cl.
 *G06T 3/00* (2006.01)
 *G06T 7/10* (2017.01)
(52) U.S. Cl.
 CPC .......... *G06T 3/0062* (2013.01); *G06T 3/0043* (2013.01); *G06T 7/10* (2017.01)

(58) Field of Classification Search
 CPC ....... G06T 3/0062; G06T 3/0043; G06T 7/10; G06T 7/73; G06T 2207/20096; G06T 2207/30244
 See application file for complete search history.

(56) References Cited

U.S. PATENT DOCUMENTS

| | | | | |
|---|---|---|---|---|
| 8,482,595 | B2* | 7/2013 | Kweon | G06T 1/00 348/37 |
| 10,863,083 | B2* | 12/2020 | Morioka | G06T 3/0018 |
| 2015/0062363 | A1* | 3/2015 | Takenaka | H04N 5/23238 348/218.1 |
| 2016/0073024 | A1 | 3/2016 | Yamamoto | |
| 2018/0061011 | A1* | 3/2018 | Kim | G06T 7/11 |
| 2019/0208141 | A1* | 7/2019 | Oyama | G06T 7/246 |

FOREIGN PATENT DOCUMENTS

| | | |
|---|---|---|
| JP | 2005-063012 A | 3/2005 |
| JP | 2012-234432 A | 11/2012 |
| JP | 2016-149733 A | 8/2016 |
| JP | 2017-017674 A | 1/2017 |

* cited by examiner

*Primary Examiner* — John B Strege
(74) *Attorney, Agent, or Firm* — Harness, Dickey & Pierce, P.L.C.

(57) ABSTRACT

An information processing apparatus includes circuitry. The circuitry is configured to detect at least one line segment in a reference direction from a partial area of an image. The circuitry is configured to calculate an inclination of a plane including coordinates of two points included in the at least one line segment in a spherical coordinate system and a reference point of the spherical coordinate system. The circuitry is configured to correct a zenith of the image based on the inclination of the plane.

12 Claims, 13 Drawing Sheets

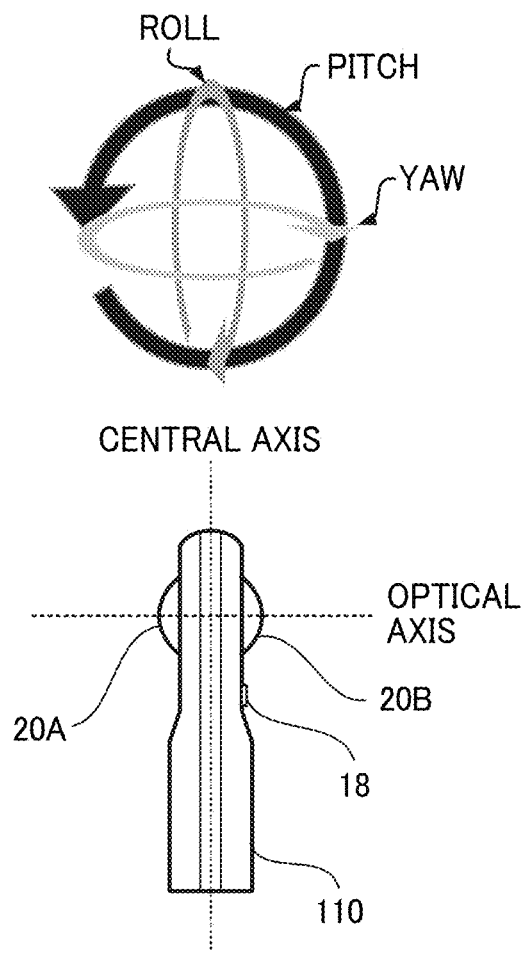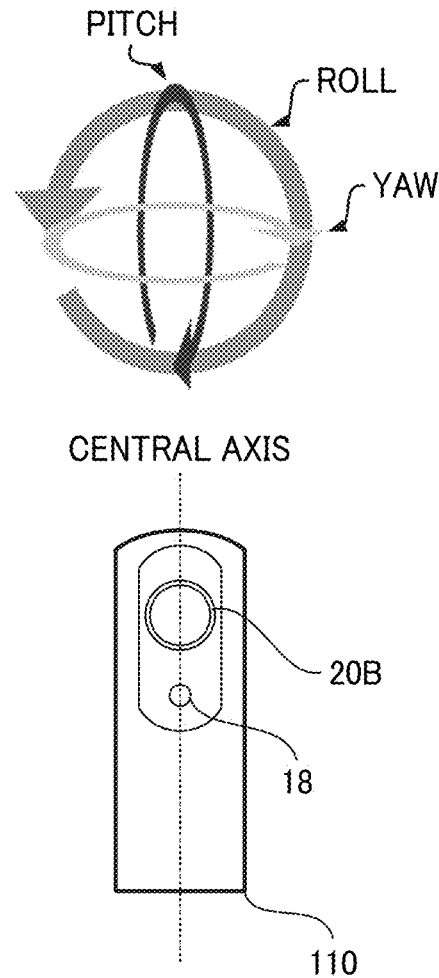

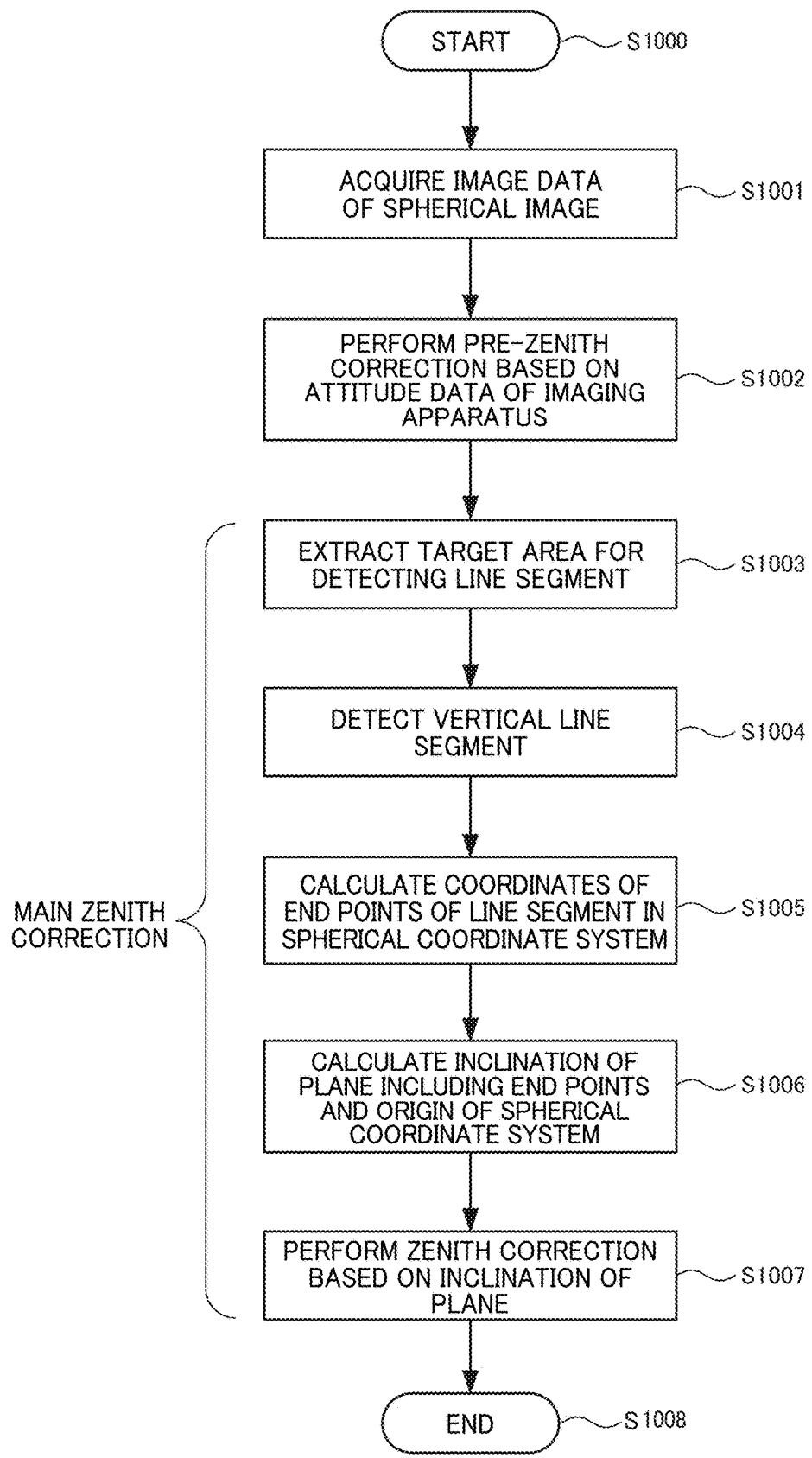

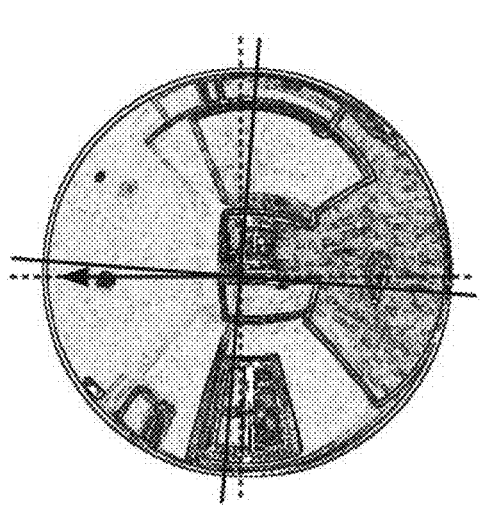
FIG. 12A
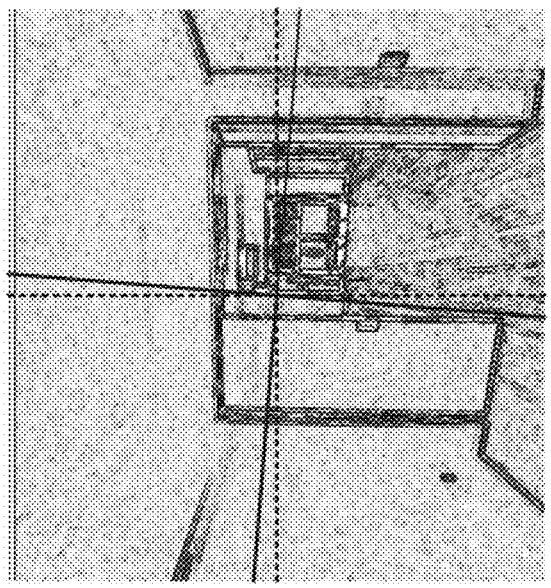
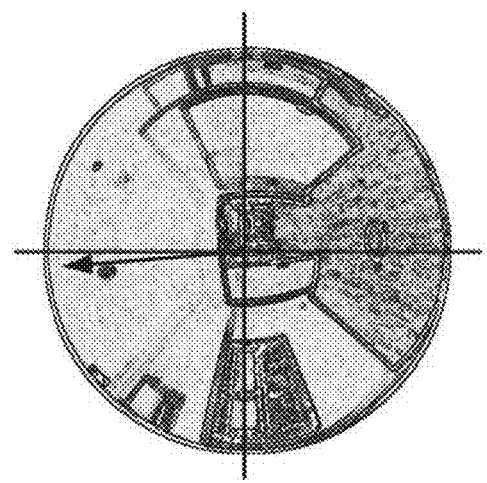
FIG. 12B
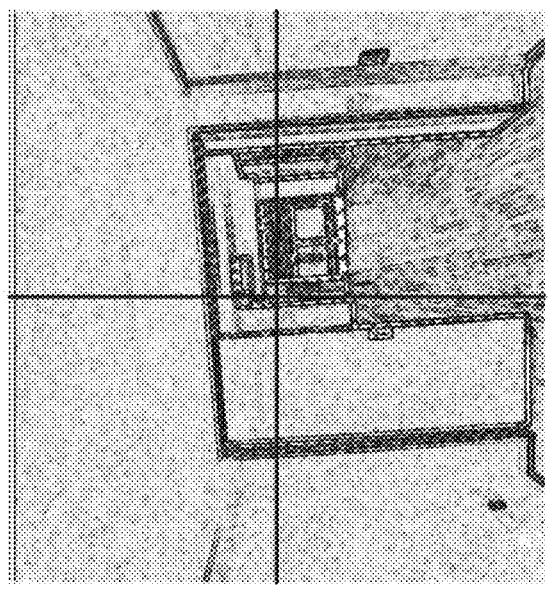

INFORMATION PROCESSING APPARATUS FOR CORRECTING A ZENITH OF A SPHERICAL IMAGE, INFORMATION PROCESSING METHOD, AND NON-TRANSITORY COMPUTER-READABLE RECORDING MEDIUM

CROSS-REFERENCE TO RELATED APPLICATION

This patent application is based on and claims priority pursuant to 35 U.S.C. § 119(a) to Japanese Patent Application No. 2019-171489, filed on Sep. 20, 2019, in the Japan Patent Office, the entire disclosure of which is hereby incorporated by reference herein.

BACKGROUND

Technical Field

Embodiments of the present disclosure generally relate to an information processing apparatus, an information processing method, and a non-transitory computer-readable recording medium, and more particularly, to an information processing apparatus for correcting a zenith of a spherical image, an information processing method, and a non-transitory computer-readable recording medium storing computer-readable program code that causes a computer to perform the information processing method.

Related Art

There is known an imaging apparatus (hereinafter referred to as an omnidirectional imaging apparatus) that captures a so-called omnidirectional image or spherical image with a plurality of wide-angle lenses or fisheye lenses and a plurality of image sensors.

As a technique of correcting a spherical image, there is known a so-called "zenith correction" to correct the spherical image such that the gravitational direction and a vertical direction of the image match. The zenith correction on the spherical image allows a viewer to see the spherical image with a more natural feeling.

There is known a technique of performing the zenith correction based on image data of a captured spherical image.

In the zenith correction based on the image data, the accuracy of extracting a ridge line in the vertical direction has some impacts on the accuracy of the zenith correction.

SUMMARY

In one embodiment of the present disclosure, a novel information processing apparatus includes circuitry. The circuitry is configured to detect at least one line segment in a reference direction from a partial area of an image. The circuitry is configured to calculate an inclination of a plane including coordinates of two points included in the at least one line segment in a spherical coordinate system and a reference point of the spherical coordinate system. The circuitry is configured to correct a zenith of the image based on the inclination of the plane.

Also described are novel information processing method and non-transitory, computer-readable recording medium storing computer-readable program code that causes a computer to perform the information processing method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 4A is a side view of the omnidirectional imaging apparatus;

FIG. 4B is a front view of the omnidirectional imaging apparatus;

FIG. 7 is a flowchart of a process executed by the information processing apparatus;

FIG. 12A is a diagram illustrating a spherical image before main zenith correction;

FIG. 12B is a diagram illustrating the spherical image of FIG. 12A after the main zenith correction;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
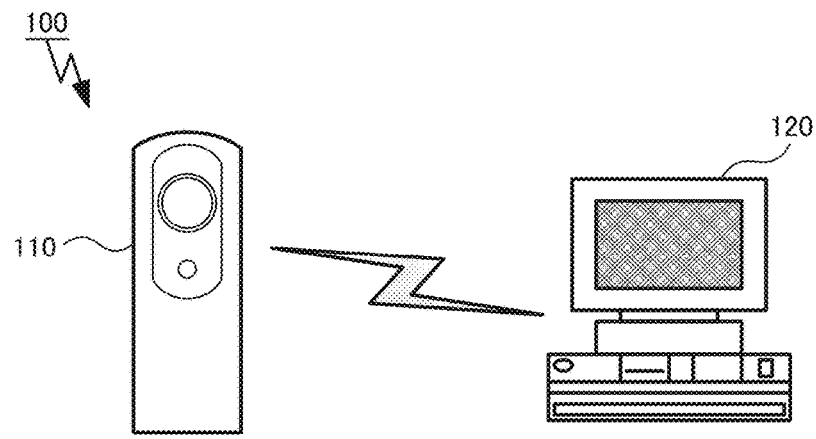
FIG. 1 is a schematic diagram illustrating a hardware configuration of an entire system according to an embodiment of the present disclosure.

In describing embodiments illustrated in the drawings, specific terminology is employed for the sake of clarity.

However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

As used herein, the singular forms "a," "an," and "the" are intended to include the plural forms as well, unless the context clearly indicates otherwise.

Referring to the drawings, wherein like reference numerals designate identical or corresponding parts throughout the several views, embodiments of the present disclosure are described below.

Initially with reference to FIG. 1, a description is given of a hardware configuration of a system according to an embodiment of the present disclosure.

FIG. 1 is a schematic diagram illustrating a hardware configuration of an entire system 100 according to an embodiment of the present disclosure.

As an example, FIG. 1 illustrates the system 100 including an omnidirectional imaging apparatus 110 and an information processing apparatus 120. The omnidirectional imaging apparatus 110 and the information processing apparatus 120 communicate data with each other in a wired or wireless manner. For example, the omnidirectional imaging apparatus 110 transmits a captured image to the information processing apparatus 120. Note that the data exchange between the omnidirectional imaging apparatus 110 and the information processing apparatus 120 is not limited to the aforementioned wired or wireless communication. Alternatively, for example, the omnidirectional imaging apparatus 110 and the information processing apparatus 120 may exchange data with various recording media.

The omnidirectional imaging apparatus 110 captures wide-angle lens images or fisheye lens images to capture an image (hereinafter referred to as a spherical image) with a solid angle of 4π steradians centered on the omnidirectional imaging apparatus 110. Note that a detailed description of a configuration of the omnidirectional imaging apparatus 110 is deferred.

The information processing apparatus 120 is, e.g., a terminal device such as a personal computer or a smartphone. The information processing apparatus 120 performs various types of image processing on the spherical image captured by the omnidirectional imaging apparatus 110. The information processing apparatus 120 also displays the spherical image. Examples of the image processing performed by the information processing apparatus 120 include zenith correction of the spherical image, correction of image brightness and tint, and processing such as image blurring and adding text to an image.

Figure 2:
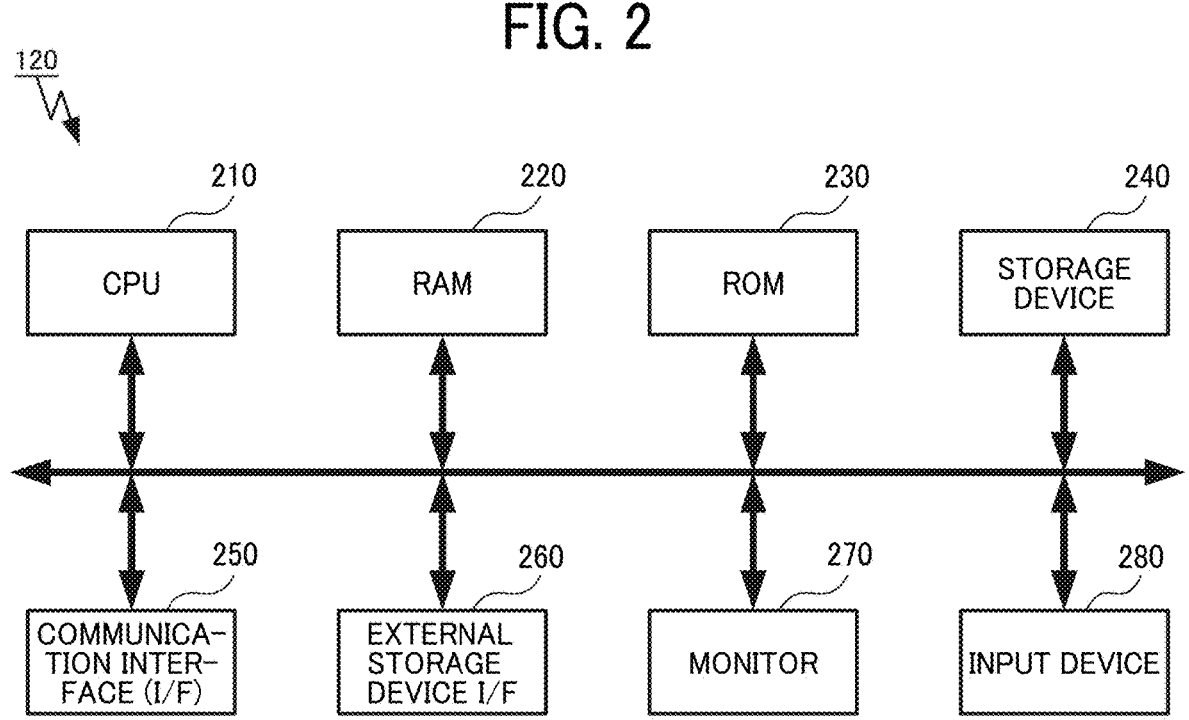
FIG. 2 is a block diagram illustrating a hardware configuration of an information processing apparatus included in the system of FIG. 1.

Referring now to FIG. 2, a description is given of a hardware configuration of the information processing apparatus 120 included in the system 100 described above.

FIG. 2 is a block diagram illustrating the hardware configuration of the information processing apparatus 120 according to the present embodiment.

The information processing apparatus 120 includes a central processing unit (CPU) 210, a random access memory (RAM) 220, a read only memory (ROM) 230, a storage device 240, a communication interface (I/F) 250, an external storage device I/F 260, a monitor 270, and an input device 280 connected to each other via a bus.

The CPU 210 is a device that executes programs to control operations of the information processing apparatus 120 and perform given processing. The RAM 220 is a volatile storage device to provide a work area for the CPU 210 to execute a program. The RAM 220 is used to store and expand programs and data. The ROM 230 is a non-volatile storage device to store firmware and programs that the CPU 210 executes.

The storage device 240 is a readable/writable non-volatile storage device that stores, e.g., an operating system (OS), which causes the information processing apparatus 120 to function, various applications, setting information, and various data. Examples of the storage device 240 include a hard disk drive (HDD) and a solid state drive (SSD).

The communication I/F 250 connects the information processing apparatus 120 and a network to enable communication with other devices via the network. The communication via the network may be wired communication or wireless communication. Various data can be transmitted and received using a given communication protocol such as Transmission Control Protocol/Internet Protocol (TCP/IP). The communication I/F 250 can also directly communicate with other devices without going through a network. For example, the communication I/F 250 can directly communicate with the omnidirectional imaging apparatus 110.

The external storage device I/F 260 is an interface to read data from and write data on various recording media. Examples of the recording medium include a compact disc read-only memory (CD-ROM), a digital versatile disk (DVD), and a secure digital (SD) card. Examples of the external storage device I/F 260 include a CD drive, a DVD drive, and an SD card slot that allow data to be read from and written on the recording medium described above. The recording medium and the external storage device I/F 260 are not limited to the examples described above.

The monitor 270 is a display device that displays various data, images, and the state of the information processing apparatus 120 to a user, for example. An example of the monitor 270 is a liquid crystal display (LCD). The input device 280 is a device for the user to operate the information processing apparatus 120. Examples of the input device 280 include a keyboard and a mouse. Note that the monitor 270 and the input device 280 may be separate devices or may construct an integrated device such as a touch panel display having both functions of the monitor 270 and the input device 280.

Figure 3:
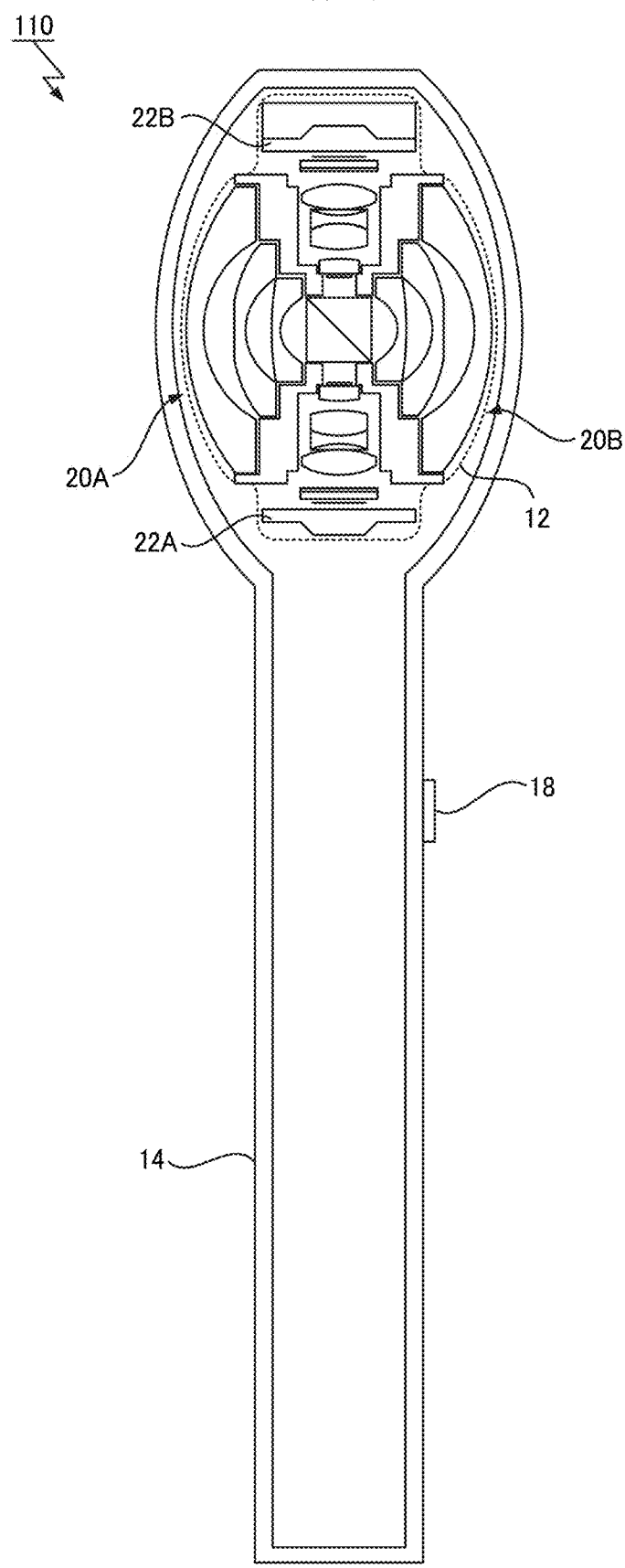
FIG. 3 is a cross-sectional view of an omnidirectional imaging apparatus included in the system of FIG. 1.

Referring now to FIG. 3, a description is given of a hardware configuration of the omnidirectional imaging apparatus 110 included in the system 100 described above.

FIG. 3 is a cross-sectional view of the omnidirectional imaging apparatus 110 according to the present embodiment.

The omnidirectional imaging apparatus 110 illustrated in FIG. 3 includes an imaging body 12, a housing 14 that holds the imaging body 12 and components such as a controller and a battery, and a shutter button 18 disposed on the housing 14. The omnidirectional imaging apparatus 110 further includes devices such as a communication I/F and various sensors such as an acceleration sensor and a geomagnetic sensor. With the aforementioned various devices, the omnidirectional imaging apparatus 110 acquires attitude data and transfers an image to the information processing apparatus 120. Note that a detailed description of the aforementioned devices is deferred.

The imaging body 12 illustrated in FIG. 3 includes two lens optical systems 20A and 20B and two image sensors 22A and 22B. The image sensors 22A and 22B are, e.g., complementary metal oxide semiconductor (CMOS) sensors or charge-coupled device (CCD) sensors. The image sensors 22A and 22B are arranged such that the respective imaging surfaces are opposed to each other. Each of the lens optical systems 20A and 20B includes a 7-element, 6-group fisheye lens or 14-element, 10-group fisheye lens, for example. In the embodiment illustrated in FIG. 3, the fisheye lens has a full angle of view wider than 180 degrees (=360 degrees/n, where n denotes the number of optical systems and n is 2). Preferably, the fisheye lens has an angle of view equal to or wider than 190 degrees. Note that, a description is herein given of the embodiment that uses two fisheye lenses having a full angle of view equal to or wider than 180 degrees. Alternatively, provided that a given angle of view is acquired as a whole, the imaging body 12 may include three or more lens optical systems and image sensors. Relatedly, in the embodiment herein described, the fisheye lenses are used. Alternatively, provided that a given angle of view is acquired as a whole, use of other wide-angle lenses or ultra-wide-angle lenses in place of the fisheye lenses is not hindered.

The relative positions of optical elements (e.g., lenses, prisms, filters, and aperture stops) of the two lens optical systems 20A and 20B are determined relative to the image sensors 22A and 22B. Specifically, the relative positions are determined such that an optical axis of the optical elements of each of the lens optical systems 20A and 20B is positioned perpendicular to the center of a light receiving area of the corresponding image sensor 22 and that the light receiving area serves as an image plane of the corresponding fisheye lens. Note that, a description is given of the embodiment that adopts folded optics in which the beam condensed by the two lens optical systems 20A and 20B is divided to the two image sensors 22A and 22B by two 90-degree prisms to reduce the parallax. Alternatively, a three-time refraction structure may be adopted to further reduce parallax. Alternatively, a straight optical system may be adopted to reduce cost.

In the embodiment illustrated in FIG. 3, the lens optical systems 20A and 20B having identical specifications are combined in opposite directions such that the respective optical axes of the lens optical systems 20A and 20B coincide with each other. Each of the image sensors 22A and 22B converts a received light distribution into image signals and sequentially output images to an image processing block on the controller. As will be described in detail later, the images captured by the respective image sensors 22A and 22B are subjected to a combining process. Thus, a spherical image is generated. The spherical image is generated by capturing all directions viewable from a capturing point. Note that, in the embodiment herein described, the spherical image is generated. Alternatively, an all-around image or a so-called 360-degree panoramic image may be generated by capturing a horizontal plane 360 degrees alone. Alternatively, a partial image may be generated by capturing part of a panoramic view of a 360-degree horizontal plane or a whole sphere. For example, a dome image may be generated by capturing a 360-degree horizontal plane and a 90-degree vertical plane from a horizontal line. The spherical image may be acquired as a still image. Alternatively, the spherical image may be acquired as a moving image.

Referring now to FIGS. 4A to 5B, a description is given of the zenith correction.

FIGS. 4A and 4B are diagrams for describing a definition of attitude of the omnidirectional imaging apparatus 110 according to the present embodiment. Specifically, FIG. 4A is a side view of the omnidirectional imaging apparatus 110. FIG. 4B is a front view of the omnidirectional imaging apparatus 110.

As illustrated in FIGS. 4A and 4B, "roll", "pitch", and "yaw" are defined as attitude angles of the omnidirectional imaging apparatus 110. The "roll" is an angle of rotation about an axis in a front-rear direction, which is a direction of the optical axis passing through the center of each of the two lenses of the omnidirectional imaging apparatus 110. The "pitch" is an angle of rotation about an axis in a lateral direction of the omnidirectional imaging apparatus 110. The "yaw" is an angle of rotation about an axis in a vertical direction of the omnidirectional imaging apparatus 110. The "pitch" represents a rotation of the omnidirectional imaging apparatus 110 as if the omnidirectional imaging apparatus 110 bows with one lens (e.g., the lens on a side opposite a side having the shutter button 18) as a front part. The "roll" represents a lateral rotation about the optical axis of the lenses of the omnidirectional imaging apparatus 110. The "yaw" represents a rotation about a central axis of the housing 14 of the omnidirectional imaging apparatus 110.

Note that, in the embodiment herein described, the front and rear of the omnidirectional imaging apparatus 110 are defined for the sake of convenience as follows.

That is, the lens optical system 20A on the side opposite the side having the shutter button 18 is defined as a front lens. The side captured with the front lens is defined as a front (F) side. By contrast, the lens optical system 20B on the side having the shutter button 18 is defined as a rear lens. The side captured with the rear lens is defined as a rear (R) side.

Figure 5A:
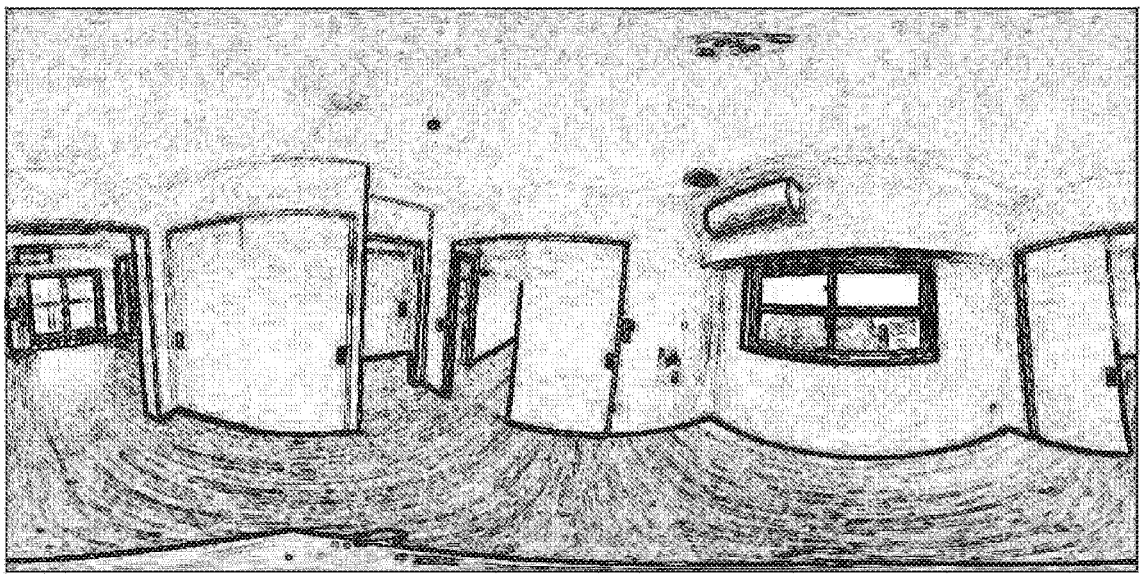
FIG. 5A is a diagram illustrating a spherical image before zenith correction.
Figure 5B:
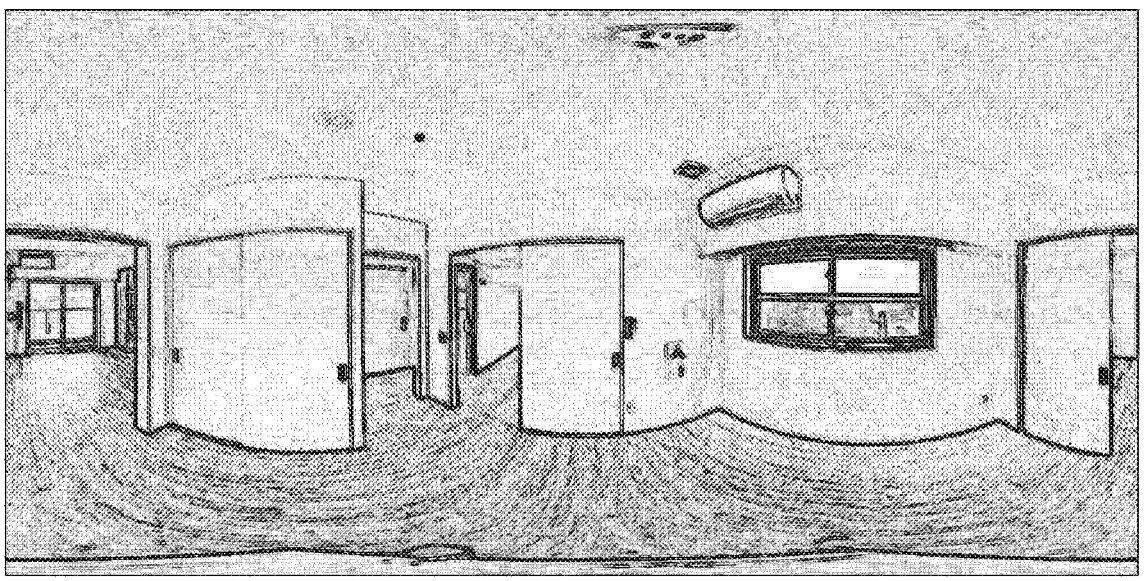
FIG. 5B is a diagram illustrating the spherical image of FIG. 5A after the zenith correction.

FIGS. 5A and 5B illustrate an example of the zenith correction of a spherical image.

The images illustrated in FIGS. 5A and 5B are an equirectangular images acquired by projecting a spherical image on a plane by equirectangular projection. Note that images exemplified as spherical images in the drawings referring to which the embodiments are herein described are images processed by line drawing. The images do not particularly limit the embodiments. The images are processed to be easily viewable on the specification.

A description is now given of displaying a spherical image on a plane. The equirectangular projection is one of projection ways for displaying a spherical image on a plane. The equirectangular projection is an image format in which the three-dimensional direction of each pixel of a spherical image is decomposed into the latitude and longitude and pixel values are arranged in a square lattice. For example, in the equirectangular projection, the earth is projected such that latitude lines and meridians intersect at right angles and at equal intervals. In the following description, the spherical image displayed in the equirectangular format is regarded as the earth. For the sake of convenience, the longitudinal direction, the lateral direction, and the center in the longitudinal direction are herein described as latitude, longitude, and equator, respectively.

FIG. 5A is a diagram illustrating a spherical image before the zenith correction. FIG. 5B is a diagram illustrating the spherical image of FIG. 5A after the zenith correction.

The omnidirectional imaging apparatus 110 may not be upright at the time of capturing, depending on the capturing situation or environment. In such a case, as illustrated in FIG. 5A, the zenith direction of the spherical image does not coincide with the gravitational direction before zenith correction. FIG. 5A is an image acquired by capturing the interior of a general building. Therefore, a longitudinal direction of structures such as doors, sliding doors, window frames, pillars, and wall surfaces is generally a vertical direction. However, in a case in which the omnidirectional imaging apparatus 110 is not upright at the time of capturing, an image is generated as illustrated in FIG. 5A in which the longitudinal direction of the various structures does not coincide with the zenith direction due to a shift in attitude of the omnidirectional imaging apparatus 110 at the time of capturing.

To address such a situation, the zenith correction is performed based on attitude data of the omnidirectional imaging apparatus 110 at the time of capturing. The attitude data is information indicating an attitude of a device that captures an image. Specifically, the attitude data herein indicates, as an attitude angle, the orientation of the omnidirectional imaging apparatus 110 by biaxial Euler angles (i.e., roll angle and pitch angle). Note that, e.g., an acceleration sensor included in the omnidirectional imaging apparatus 110 outputs the attitude angle of the omnidirectional imaging apparatus 110. The zenith correction based on the attitude data corrects a spherical image such that the longitudinal direction of the various structures coincides with the zenith direction as illustrated in FIG. 5B. However, a measurement accuracy of the acceleration sensor decreasing due to various factors might hamper acquisition of accurate attitude data, further hampering an appropriate zenith correction. That is, as illustrated in FIG. 5B, for example, a spherical image with a slight error might be output, though the zenith direction of the spherical image appears to be consistent with the gravitational direction. Even such a slight error might cause unnaturalness or discomfort to a viewer depending on the type of service using the spherical image, thus raising an unfavorable situation. To address such an unfavorable situation, the information processing apparatus 120 of the present embodiment corrects a zenith of a spherical image by image processing. Note that the factors that reduce the measurement accuracy of the acceleration sensor are, e.g., a measurement error, an error in mounting the acceleration sensor, and a temperature drift.

Figure 6:
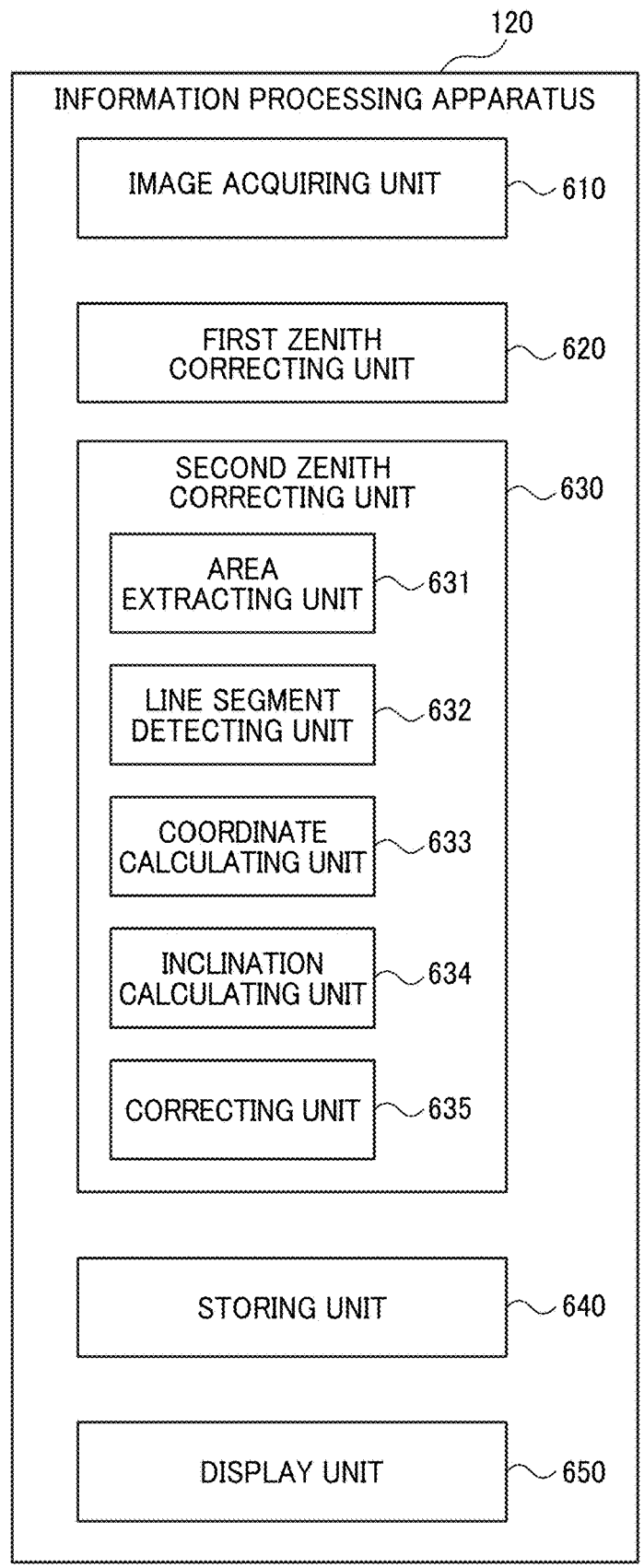
FIG. 6 is a block diagram illustrating a software configuration of the information processing apparatus.

Referring now to FIG. 6, a description is given of a software configuration of the information processing apparatus 120.

FIG. 6 is a block diagram illustrating the software configuration of the information processing apparatus 120.

The information processing apparatus 120 includes, as functional units, an image acquiring unit 610, a first zenith correcting unit 620, a second zenith correcting unit 630, a storing unit 640, and a display unit 650. A detailed description is now given of the functional units of the information processing apparatus 120. Note that, in the following description, a zenith correction performed by the first zenith correcting unit 620 based on attitude data is referred to as "preliminary zenith correction" or "pre-zenith correction"; whereas a zenith correction performed by the second zenith correcting unit 630 by image processing is referred to as "main zenith correction". Thus, the zenith correction performed by the first zenith correcting unit 620 and the zenith correction performed by the second zenith correcting unit 630 may be occasionally distinguished.

The image acquiring unit 610 acquires image data of a spherical image captured by the omnidirectional imaging apparatus 110, via the communication I/F 250 or the external storage device I/F 260, for example. Note that the image data acquired by the image acquiring unit 610 may include attitude data at the time of capturing as metadata.

The first zenith correcting unit 620 performs zenith correction based on the attitude data included in the image data. As will be described later in detail, in the present embodiment, the second zenith correcting unit 630 performs the main zenith correction by image processing of the spherical image. Prior to the main zenith correction, the first zenith correcting unit 620 performs the pre-zenith correction based on the attitude data, allowing the second zenith correcting unit 630 to perform the main zenith correction with an increased accuracy. Alternatively, however, the main zenith correction may be simply performed without the pre-zenith correction. Note that the pre-zenith correction can be performed as described above with reference to FIGS. 5A and 5B.

The second zenith correcting unit 630 performs zenith correction by image processing on the spherical image. The second zenith correcting unit 630 includes, as functional units, an area extracting unit 631, a line segment detecting unit 632, a coordinate calculating unit 633, an inclination calculating unit 634, and a correcting unit 635. With the functional units, the second zenith correcting unit 630 performs a series of operations of the main zenith correction.

The area extracting unit 631 extracts a target area from which a line segment is detected to evaluate the inclination of an image in the main zenith correction. As an example, the area extracting unit 631 extracts, from a spherical image displayed in the equirectangular format, an area having a given spread in the vertical direction from the equator.

The line segment detecting unit 632 detects a line segment from a subject included in the target area extracted by the area extracting unit 631. In particular, the line segment detecting unit 632 detects, from the subject included in the target area, at least one line segment of which a direction has a high probability of being a vertical direction. Note that, in the following description, a line segment in a vertical direction may be simply referred to as a "vertical line segment", including the line segment of which the direction has a high probability of being the vertical direction. Such detection allows an appropriate evaluation of the inclination of the image, that is, the amount of deviation from the zenith direction. Accordingly, the zenith correction is performed with an enhanced accuracy. Note that, in the embodiments herein described, a vertical line segment is detected. Alternatively, a line segment in a reference direction may be detected.

The coordinate calculating unit 633 calculates coordinates of two points included in the line segment detected by the line segment detecting unit 632. As the coordinates of the two points included in the line segment, the coordinate calculating unit 633 calculates the coordinates of end points of the line segment in a spherical coordinate system, for example.

The inclination calculating unit 634 calculates an inclination of a plane including the coordinates of the end points of the line segment calculated by the coordinate calculating unit 633 and the origin of the spherical coordinate system. The inclination of the plane calculated by the inclination calculating unit 634 is treatable as a correction parameter for a zenith correction process in the correcting unit 635. The inclination calculating unit 634 may be configured to calculate the inclination of the plane for each of the line segments detected by the line segment detecting unit 632. The inclination calculating unit 634 may be configured to calculate, as an inclination of the spherical image, a mean value of inclinations of planes calculated.

The correcting unit 635 performs the main zenith correction on the spherical image with the inclination of the plane calculated by the inclination calculating unit 634 as a correction parameter. The spherical image corrected by the correcting unit 635 is stored by the storing unit 640 or displayed by the display unit 650.

The storing unit 640 controls the operation of the storage device 240 to store and read various data. In the present embodiment, the storing unit 640 stores or reads data of the spherical image before correction and data of the spherical image after correction.

The display unit 650 controls the operation of the monitor 270 to display, e.g., various user interfaces (UIs) and the spherical image.

Note that the CPU 210 executes programs of the present embodiment to function the hardware described above, thereby implementing the functional units described above with reference to the block diagram illustrated in FIG. 6. All of the functional units according to the embodiments of the present disclosure may be implemented by software. Alternatively, a part or all of the functional units may be implemented as hardware providing equivalent functions.

Referring now to FIG. 7, a detailed description is given of the main zenith correction executed by the functional units described above.

FIG. 7 is a flowchart of a process executed by the information processing apparatus 120 according to the present embodiment.

Note that, in the following description with reference to FIG. 7, FIGS. 8A to 13 will also be referenced as appropriate.

The information processing apparatus 120 starts the process from step S1000.

In step S1001, the image acquiring unit 610 acquires image data of a spherical image captured by the omnidirectional imaging apparatus 110. The image acquiring unit 610 acquires the image data via, e.g., the communication I/F 250 or the external storage device I/F 260. Note that the image data of the spherical image acquired by the image acquiring unit 610 may include attitude data of the omnidirectional imaging apparatus 110 at the time of capturing.

Subsequently, in step S1002, the first zenith correcting unit 620 performs the pre-zenith correction on the spherical image acquired in step S1001 based on the attitude data. Since the first zenith correcting unit 620 thus performs the zenith correction based on the attitude data before the second zenith correcting unit 630 performs the main zenith correction, the second zenith correcting unit 630 performs accurate image processing at the time of the main zenith correction. In short, the second zenith correcting unit 630 performs the zenith correction with a further enhanced accuracy. Note that the pre-zenith correction in step S1002 may be omitted. The pre-zenith correction may not involve generation of an image. For example, the first zenith correcting unit 620 may transfer, to the second zenith correcting unit 630, a conversion table (i.e., rotation matrix) of an image in the pre-zenith correction generated based on the attitude data. The second zenith correcting unit 630 may perform image processing, taking into account a parameter of the conversion table. With such a configuration, the information processing apparatus 120 reduces the number of times of processing for generating the zenith-corrected image and shortens a period of time for processing.

Thereafter, in steps S1003 to S1007, the second zenith correcting unit 630 performs the main zenith correction by image processing of the spherical image. Note that since a low resolution has a small impact on detection of line segments, the second zenith correcting unit 630 may be configured to perform the following processing after lowering the resolution of the spherical image to reduce a calculation cost for the image processing.

Firstly, in step S1003, the area extracting unit 631 extracts, from the spherical image, a target area for detecting a line segment.

Subsequently, in step S1004, the line segment detecting unit 632 detects a vertical line segment from the target area extracted in step S1003.

Figure 8A:
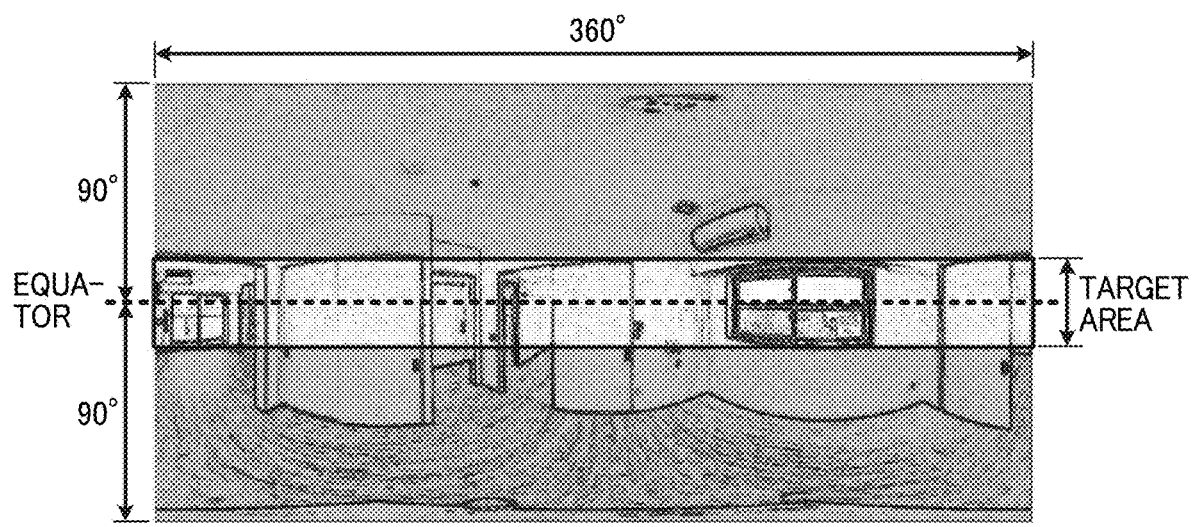
FIG. 8A is a diagram illustrating a spherical image.
Figure 8B:
FIG. 8B is a diagram illustrating a target area extracted from the spherical image of FIG. 8A.
Figure 8C:
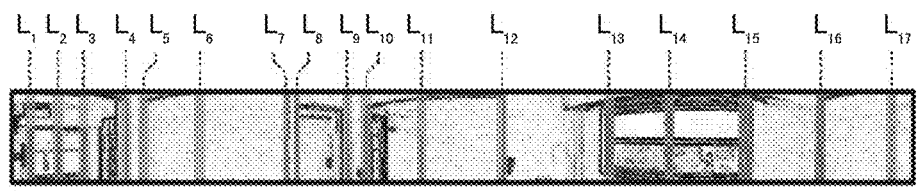
FIG. 8C is a diagram illustrating line segments detected from the target area of FIG. 8B.
Figure 9:
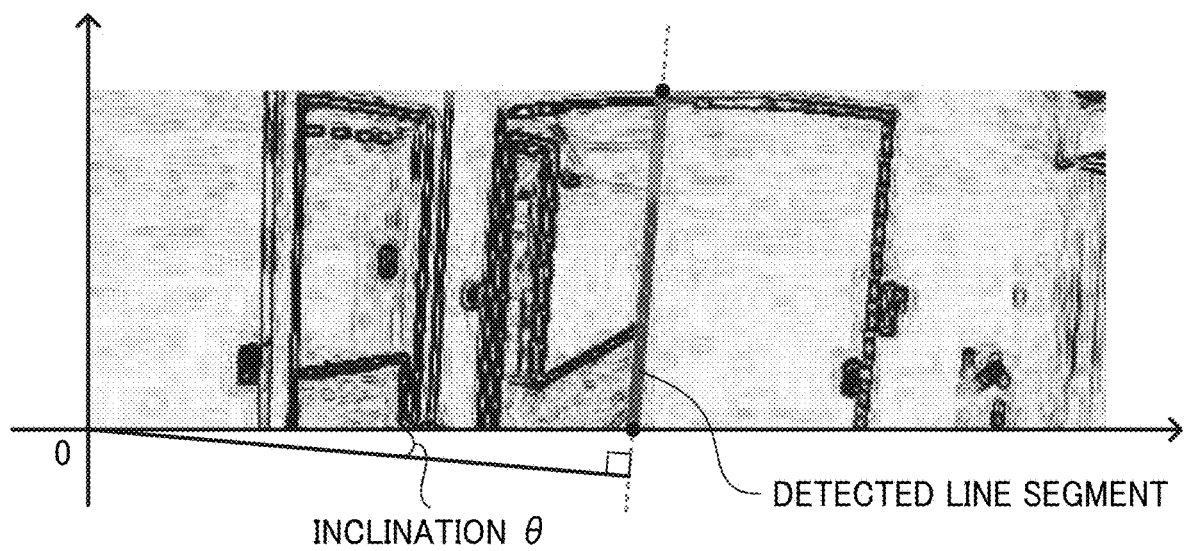
FIG. 9 is a diagram illustrating an example for calculation of an inclination of a line segment detected.

Referring now to FIGS. 8A to 9, a description is given of a specific example of the operations in steps S1003 and S1004.

FIGS. 8A and 8B illustrate an example of detecting a line segment from a target area according to the present embodiment.

FIG. 8A is a diagram illustrating an equirectangular spherical image subjected to the pre-zenith correction. The image illustrated in FIG. 8A corresponds to the image illustrated in FIG. 5B.

For the sake of convenience, FIG. 8A illustrates the spherical image as an equirectangular image that is spread 360° in a longitude direction and 180° in a latitude direction, specifically, 90° upward and 90° downward from the equator as a center in the latitude direction. In step S1003, the area extracting unit 631 extracts, as a target area, the area that is not grayed out in FIG. 8A. With respect to the range of the target area, the target area may be an area having a spread centered on the equator in the latitude direction. In other words, the target area is a partial area extracted with a given size vertically from the equator as a center from the image in the equirectangular format. The size of the target area does not particularly limit the embodiments. The target area is set within a given range centered on the equator. Preferably, the range of the target area is herein within a range of about 20° to about 35°. An increased spread in the latitude direction hampers detection of line segments; whereas a decreased spread in the latitude direction facilitates detection of noise and reduces the detection accuracy of line segments. In general, an outdoor image preferably has a narrower spread in the latitude direction than a spread in the latitude direction of an indoor image. Extracting an area around the equator as a target area as described above eliminates the impact of image distortion in a high latitude area, thus reducing the calculation cost in detecting the line segments and enhancing the detection accuracy.

FIG. 8B is a diagram illustrating the target area extracted from the spherical image of FIG. 8A in step S1003.

Note that the extraction of the target area may not involve generation of an extracted image as illustrated in FIG. 8B, provided that the target area can be simply distinguished from other areas.

In step S1004, the line segment detecting unit 632 extracts vertical line segments from the target area as illustrated in FIG. 8B.

FIG. 8C is a diagram illustrating the line segments detected from the target area of FIG. 8B in step S1004.

The line segment detecting unit 632 detects the line segments by image processing. Among the line segments thus detected, the line segment detecting unit 632 further detects line segments having a high probability of being vertical line segments, such as window frames, pillars, and doors. In the example of FIG. 8C, line segments $L_1$ to $L_{17}$ illustrated in dark color are extracted as vertical line segments.

The way of detecting the line segments is not particularly limited. As an example, detection by Hough transform is adoptable.

Referring now to FIG. 9, a description is given of the detection of a line segment by Hough transform and the calculation of inclination of the line segment.

FIG. 9 is a diagram illustrating an example for calculation of an inclination of a line segment detected according to the present embodiment.

The line segment illustrated in dark color in FIG. 9 is a line segment detected by the Hough transform. In the Hough transform, a straight line is represented by two parameters, r and θ. Here, r represents a length of a normal vector drawn as a straight line from the origin; whereas θ represents an angle of the normal vector. In the Hough transform, points on the same straight line have a property of overlapping in a parameter space of r and θ, and thus a line segment is detectable. Whether or not the line segment thus detected is a vertical line segment is determined by whether or not θ in FIG. 9 is smaller than a given threshold. As an example, a line segment having an absolute value of θ of 10° or less is detectable as a vertical line segment. Note that the detection of a line segment by the Hough transform is described above as an example and does not limit the embodiment. The line segment may be detected by another way.

The aforementioned way of detecting the line segment allows a line segment included in the target area and having an inclination smaller than the given threshold to be detected as a vertical line segment as illustrated in FIG. 8C. Note that whether or not the line segment is a vertical line segment may be determined by the given threshold as described above or may be selected by a user based on determination.

Referring back to FIG. 7, after the line segment detecting unit 632 detects the vertical line segment in step S1004, the process proceeds to step S1005. In step S1005, the coordinate calculating unit 633 calculates coordinates in the spherical coordinate system for each of the end points of the detected line segment. Since each coordinate of the equirectangular spherical image can be associated with each coordinate of the spherical coordinate system in a one-to-one correspondence, the coordinate calculating unit 633 replaces the coordinates of the end points of the line segment with the coordinates of the spherical coordinate system by use of a conversion table for conversion between a two-dimensional image and a three-dimensional image, for example.

Figure 10A:
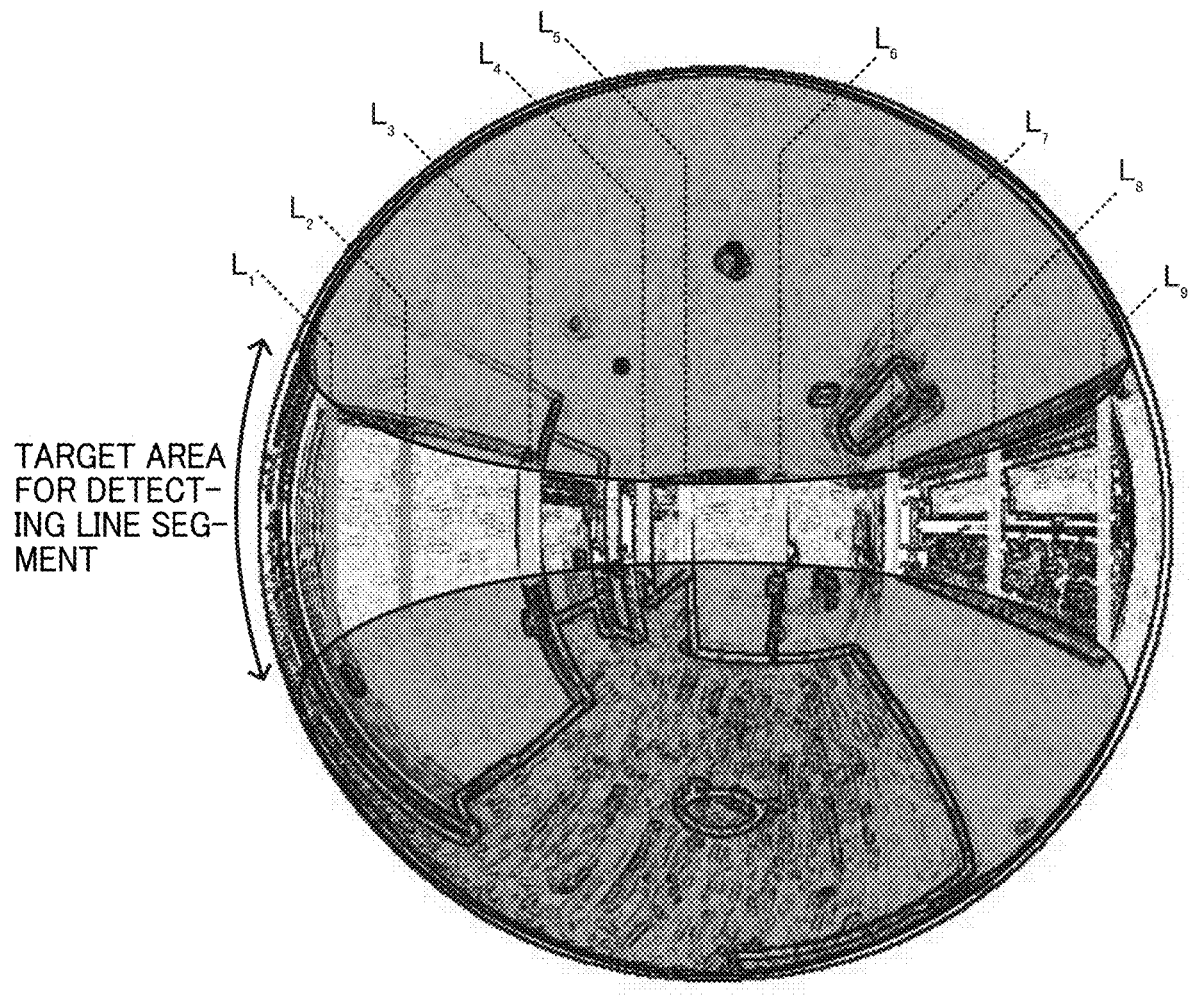
FIG. 10A is a diagram illustrating a spherical image converted into a spherical coordinate system.
Figure 10B:
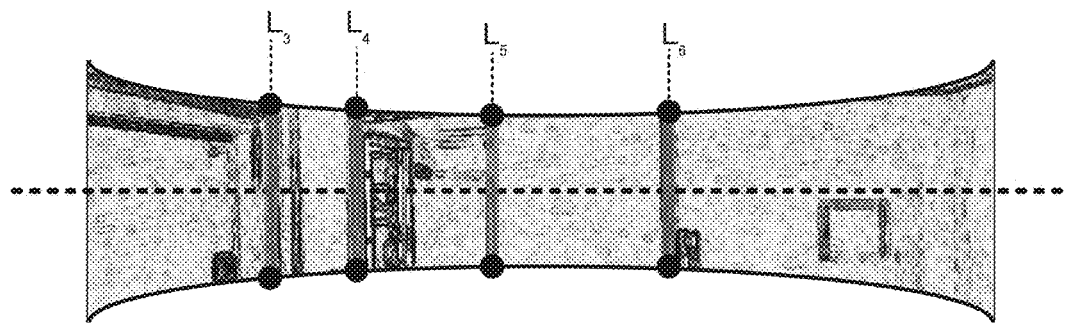
FIG. 10B is a partially enlarged view of a target area illustrated in FIG. 10A.

Referring now to FIGS. 10A and 10B, a description is given of the conversion of a line segment into the spherical coordinate system.

FIGS. 10A and 10B are diagrams for describing the conversion of a detected line segment into the spherical coordinate system according to the present embodiment.

Specifically, FIG. 10A is a diagram illustrating a spherical image converted into the spherical coordinate system.

FIG. 10A illustrates an example in which a spherical image is displayed on a hemisphere surface. In FIG. 10A, the area that is not grayed out is a target area for detecting a line segment. In the example of the spherical image illustrated in FIG. 10A, line segments $L_1$ to $L_9$ are detected. Note that since FIG. 10A illustrates the spherical image displayed on a spherical surface, the line segments in an area near the outside of the circle are represented as curves and displayed as if the direction of the line segments does not coincide with the longitudinal direction of the actual structures.

FIG. 10B is a partially enlarged view of the target area illustrated in FIG. 10A.

FIG. 10B illustrates an area including the line segments $L_3$ to $L_6$. The thick broken line indicates the equator in FIG. 10B. In step S1005, the coordinate calculating unit 633 calculates the coordinates of the end points of each line segment. The end points of the line segments are indicated by black circles in FIG. 10B. The coordinate calculating unit 633 calculates the coordinates of each end point in the spherical coordinate system.

Referring back to FIG. 7, after the coordinate calculating unit 633 calculates the coordinates of the end points of the line segments in the spherical coordinate system in step S1005, the process proceeds to step S1006. In step S1006, the inclination calculating unit 634 obtains a plane including the end points calculated in step S1005 and the origin as a reference point of the spherical coordinate system and calculates an inclination of the plane. When three points that are not on the same straight line are defined in a three-dimensional space, one plane is determined. Therefore, the inclination calculating unit 634 firstly determines the plane including each end point of the line segment and the origin of the spherical coordinate system. Note that since the plane herein determined passes through the center of the sphere and the spherical surface, the tangent line between the plane and the spherical surface corresponds to a so-called great circle of the sphere. In the following, the determined plane will be referred to as a great circle. After determining the great circle, the inclination calculating unit 634 calculates the inclination of the great circle.

Figure 11A:
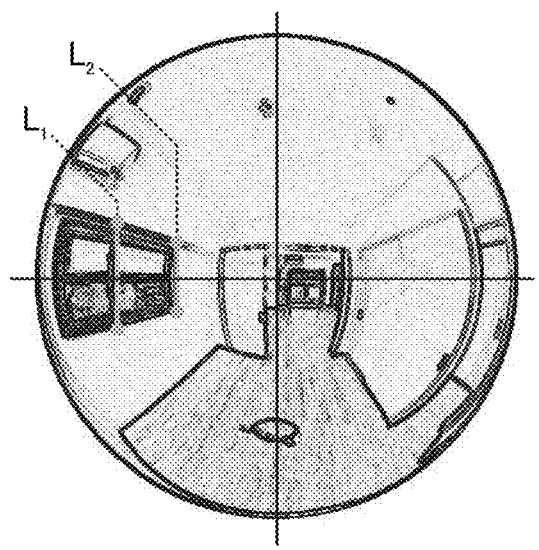
FIG. 11A is a diagram illustrating a spherical image in the spherical coordinate system, having coordinates of end points of line segments calculated.
Figure 11B:
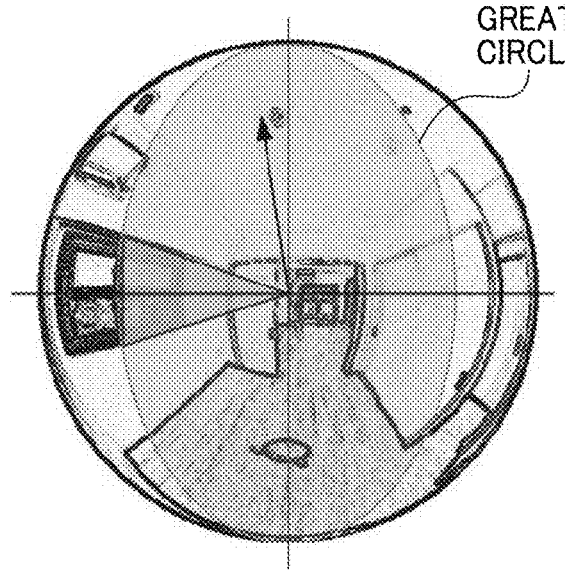
FIG. 11B is a diagram illustrating an inclination of a great circle including a line segment and an origin.
Figure 11C:
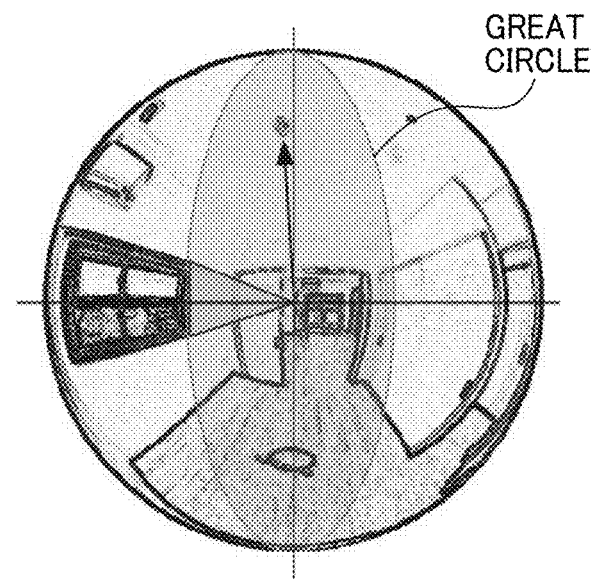
FIG. 11C is a diagram illustrating an inclination of another great circle including another line segment and the origin.

Referring now to FIGS. 11A to 11C, a description is given of the inclination of the great circle.

FIGS. 11A to 11C are diagrams for describing the inclination of some examples of the great circle including a line segment and an origin according to the present embodiment.

Specifically, FIG. 11A is a diagram illustrating a spherical image in the spherical coordinate system, having coordinates of end points of line segments calculated by the operations up to step S1005.

FIG. 11A illustrates a case in which line segments $L_1$ and $L_2$ are detected as vertical line segments. The end points of each line segment are indicated by circles.

FIG. 11B is a diagram illustrating a great circle including the end points of the line segment $L_1$. FIG. 11C is a diagram illustrating a great circle including the end points of the line segment $L_2$.

In each of FIGS. 11B and 11C, the triangle illustrated in dark color indicates a plane including each end point of the line segment and the origin of the spherical coordinate system. In addition, in each of FIGS. 11B and 11C, the circle illustrated in light color is the great circle including the plane. In step S1006, the inclination calculating unit 634 calculates the inclination of the great circle thus obtained with respect to the spherical coordinate system. The inclination of the great circle is represented as a direction vector as indicated by an arrow in each of FIGS. 11B and 11C.

The inclination of the great circle calculated by the inclination calculating unit 634, that is, the arrow indicated as the direction vector in each of FIGS. 11B and 11C is a correction parameter in the main zenith correction. In a case in which a plurality of line segments is detected, the inclination calculating unit 634 obtains an average (or mean value) of the plurality of direction vectors and uses the average as a correction parameter. The inclination calculating unit 634 may exclude a direction vector having a large difference from the mean value from the plurality of direction vectors to calculate a correction parameter.

The inclination thus calculated is treated as a correction parameter in the main zenith correction. Specifically, the zenith correction is performed by rotating the spherical image by use of the correction parameter so that the direction vector coincides with the zenith direction of the spherical coordinate system.

Referring back to FIG. 7, after the inclination calculating unit 634 calculates the inclination of the plane in step S1006, the process proceeds to step S1007. In step S1007, the correcting unit 635 performs a main correction of the spherical image based on the correction parameter, that is, the direction vector illustrated in each of FIGS. 11B and 11C. In other words, the correcting unit 635 performs zenith correction based on the inclination of the plane.

FIGS. 12A and 12B illustrate an example of the main zenith correction according to the present embodiment.

Specifically, FIG. 12A is a diagram illustrating a spherical image before the main zenith correction. FIG. 12B is a diagram illustrating the spherical image of FIG. 12A after the main zenith correction.

The arrow illustrated in FIG. 12A is a direction vector indicating a correction parameter. The lateral solid line and the longitudinal line illustrated in FIG. 12A respectively indicate a horizontal direction and a vertical direction perpendicular to the horizontal direction of the spherical coordinate system before the zenith correction.

In the main zenith correction in step S1007, the correcting unit 635 rotates the spherical image so that the direction vector coincides with the zenith direction of the spherical coordinate system. That is, the correcting unit 635 rotates the spherical image so that the arrow illustrated in FIG. 12A coincides with the longitudinal solid line illustrated in FIG. 12A. Thus, by rotating the spherical image, the correcting unit 635 performs the main zenith correction.

When the main zenith correction is performed, a spherical image is acquired as illustrated in FIG. 12B in which the arrow coincides with the zenith direction. Note that, in FIG. 12B, the solid lines respectively indicate the horizontal direction and the vertical direction before the main zenith correction; whereas the broken lines respectively indicate the horizontal direction and the vertical direction after the main zenith correction. Compared to FIG. 12A, FIG. 12B illustrates that sliding doors, pillars, and the like in the spherical image are corrected to coincide with the zenith direction by the main zenith correction.

Referring back to FIG. 7, after the correcting unit 635 performs the main zenith correction in step S1007, the process proceeds to step S1008, in which the information processing apparatus 120 ends the process. Note that the spherical image subjected to the main zenith correction may be stored in the storage device 240 by the storing unit 640 or may be displayed on the monitor 270 by the display unit 650. Thus, the spherical image subjected to the main zenith correction is used for various purposes.

By the operations described above with reference to in FIGS. 7 to 12B, the information processing apparatus 120 corrects the zenith of the spherical image by image processing.

Figure 13:
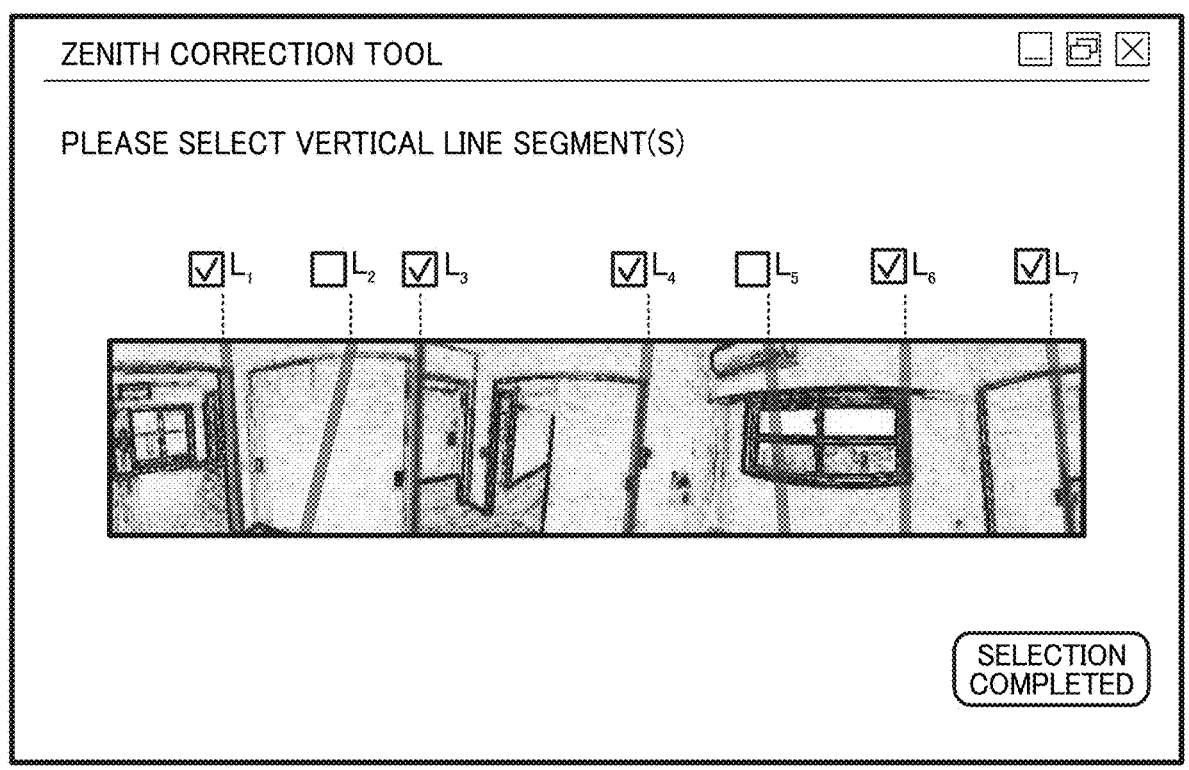
FIG. 13 is a diagram illustrating a user interface through which a line segment is selected to calculate a correction parameter.
Figure 14A:
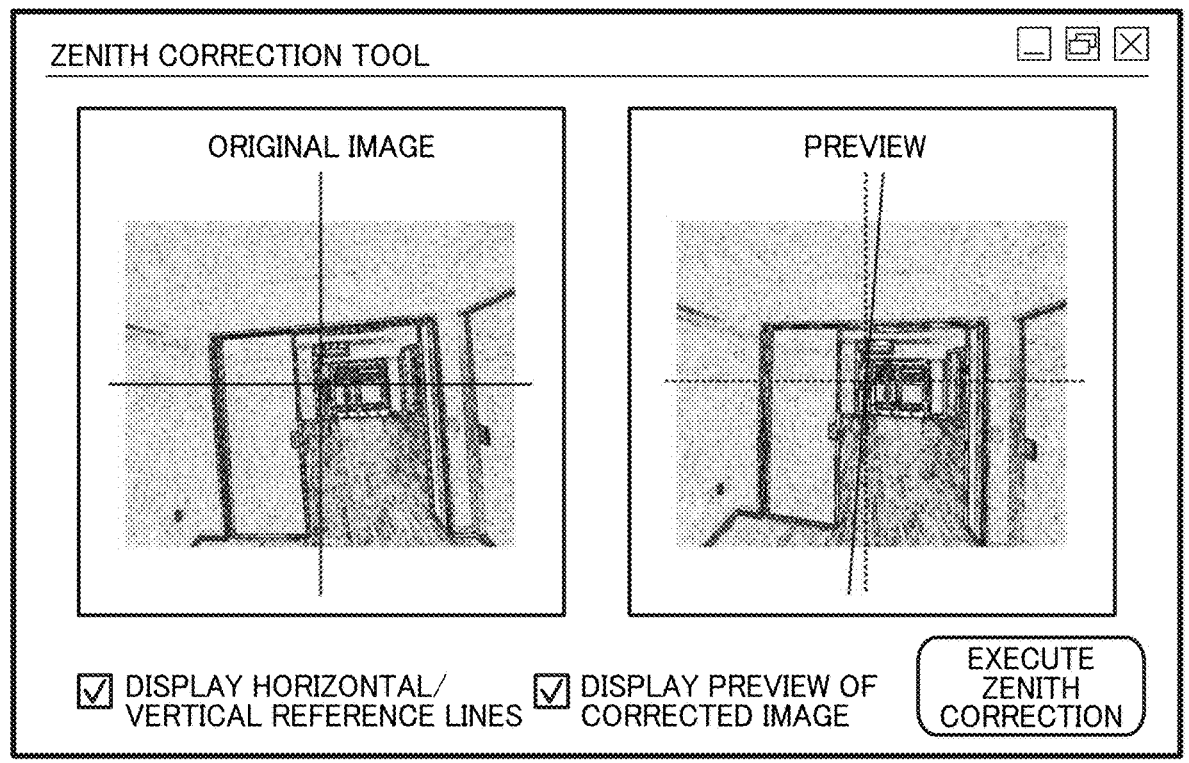
FIG. 14A is a diagram illustrating an example of a user interface through which execution of the zenith correction is instructed.
Figure 14B:
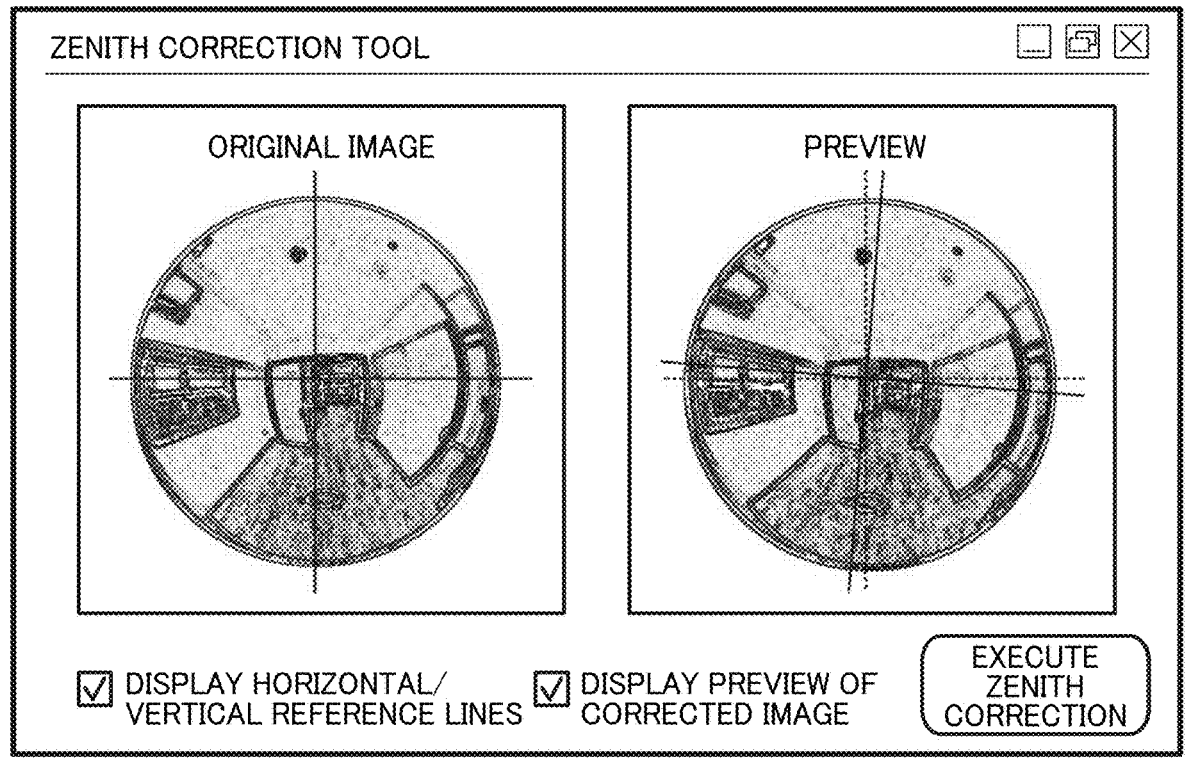
FIG. 14B is a diagram illustrating another example of the user interface through which execution of the zenith correction is instructed.

Referring now to FIGS. 13 to 14B, a description is given of various UIs displayed in the process of performing the processing described above.

Initially with reference to FIG. 13, a description is given of an example of UI.

FIG. 13 is a diagram illustrating a UI through which a line segment is selected to calculate a correction parameter. In other words, FIG. 13 illustrates a UI on the monitor 270 through which whether to determine at least one line segment in the reference direction as a calculation target is selected.

In step S1004 of FIG. 7, as described above, the line segment detecting unit 632 detects the vertical line segment based on a given condition. However, an error in image processing may hamper an accurate detection of the vertical line segment. To address such a situation, a screen as illustrated in FIG. 13 is displayed to allow, e.g., a user to select a vertical line segment. Accordingly, the line segment for calculation of the correction parameter is determined.

In the example illustrated in FIG. 13, line segments $L_1$ to $L_7$ are displayed as vertical line segments. However, for example, the line segments $L_2$ and $L_5$ are not detected according to vertical structures such as doors and pillars, and thus are preferably excluded in the calculation of the correction parameter. Note that the factors that cause such line segments to be detected are, e.g., the detection accuracy and the detection of a structure such as a tree failing to be oriented in the vertical direction.

To exclude such line segments, in the present embodiment, a line segment is selectable or excludable with, e.g., a checkbox on the screen as illustrated in FIG. 13. In the example of FIG. 13, the checkboxes of the line segments $L_2$ and L are unchecked.

Referring now to FIGS. 14A and 14B, a description is given of another example of UI.

FIGS. 14A and 14B are diagrams illustrating examples of a UI through which correction is instructed. In other words, FIGS. 14A and 14B illustrate UIs on the monitor 270 through which whether to execute the zenith correction is selected.

Specifically, FIGS. 14A and 14B illustrate examples of a screen for comparing images before and after the main zenith correction. More specifically, FIG. 14A is a diagram illustrating an example of the UI through which execution of the zenith correction is instructed. FIG. 14A illustrates an equirectangular image. FIG. 14B is a diagram illustrating another example of the UI through which execution of the zenith correction is instructed. FIG. 14B illustrates a fisheye lens image.

The UI of FIG. 14A and the UI of FIG. 14B may be switchably displayed. Note that FIG. 14A illustrates an equirectangular image, that is, an image in the equirectangular format, which does not particularly limit the embodiments. An image may be displayed in another format. For example, other than the equirectangular image as illustrated in FIG. 14A, the UI may display a spherical image subjected to perspective projection transformation and projected onto a two-dimensional plane.

The UIs illustrated in FIGS. 14A and 14B allow selection of whether to display the reference lines in the horizontal direction and the vertical direction and whether to display a preview of a corrected image. Such a UI displayed allows, e.g., a user to compare the images before and after the correction, thus facilitating determination of whether or not to perform the main zenith correction. In addition, the user can easily ascertain how much the image is corrected with the calculated correction parameter and therefore the user can easily recognize the effect of the main zenith correction. Accordingly, the user can easily determine whether or not to perform the main zenith correction.

According to the embodiments described above, there are provided an information processing apparatus, an information processing method, and a non-transitory computer-readable recording medium storing computer-readable program code that causes a computer to execute the information processing method, to enhance the accuracy of zenith correction of a spherical image.

The functions of the embodiments of the present disclosure described above can be implemented by computer-readable programs described in programming languages such as C, C++, C#, and Java (registered trademark). The programs of the embodiments of the present disclosure can be stored in a computer-readable recording medium such as a hard disk device, a CD-ROM, a magneto-optical disc (MO), a DVD, a flexible disk, an electrically erasable programmable read-only memory (EEPROM) (registered trademark), or an erasable programmable read-only memory (EPROM), thereby being distributable. Alternatively, the programs may be transmitted via a network in a format that allows another device to receive and execute the programs.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An information processing apparatus comprising circuitry configured to:
   detect at least one line segment in a reference direction from a partial area of an image;
   calculate an inclination of a plane including coordinates of two points included in the at least one line segment in a spherical coordinate system and a reference point of the spherical coordinate system; and
   correct a zenith of the image based on the inclination of the plane, wherein the circuitry is configured to:
      preliminarily correct the zenith of the image based on information indicating an attitude of a device that captures the image; and
      detect the at least one line segment based on the image preliminarily corrected.

2. The information processing apparatus according to claim 1,
   wherein the image is a spherical image.

3. The information processing apparatus according to claim 1,
   wherein the partial area is an area extracted with a given size vertically from an equator as a center from the image in an equirectangular format.

4. The information processing apparatus according to claim 1,
   wherein the circuitry is configured to determine a line segment, of the at least one line segment, having an inclination smaller than a given value as a calculation target.

5. The information processing apparatus according to claim 1,
   wherein the circuitry is configured to:
      calculate inclinations of planes including the plane based on line segments including the at least one line segment; and
      correct the zenith of the image based on a mean value of the inclinations of the planes.

6. The information processing apparatus according to claim 1, further comprising a display device configured to display the image before correction and the image after the correction,
   wherein the circuitry is configured to receive, through the display device, a selection of whether to correct the zenith of the image.

7. The information processing apparatus according to claim 1, further comprising a display device configured to display the at least one line segment in the reference direction detected,
   wherein the circuitry is configured to receive, through the display device, a selection of whether to determine the at least one line segment in the reference direction as a calculation target.

8. An information processing method comprising:
   detecting at least one line segment in a reference direction from a partial area of an image;
   calculating an inclination of a plane including coordinates of two points included in the at least one line segment in a spherical coordinate system and a reference point of the spherical coordinate system;
   correct a zenith of the image based on the inclination of the plane;
   preliminarily correct the zenith of the image based on information indicating
   an attitude of a device that captures the image; and
   detect the at least one line segment based on the image preliminarily corrected.

9. A non-transitory computer-readable recording medium storing computer-readable program code that causes a computer to perform an information processing method, the method comprising:
   detecting at least one line segment in a reference direction from a partial area of an image;

calculating an inclination of a plane including coordinates of two points included in the at least one line segment in a spherical coordinate system and a reference point of the spherical coordinate system;
correct a zenith of the image based on the inclination of the plane;
preliminarily correct the zenith of the image based on information indicating an attitude of a device that captures the image; and
detect the at least one line segment based on the image preliminarily corrected.

10. The information processing apparatus according to claim 1, wherein the circuitry is further configured to extract, from an image, a target area having a spread centered in a latitudinal direction and a longitudinal direction of the image.

11. The information processing method of claim), further comprising extracting, from an image, a target area having a spread centered in a latitudinal direction and a longitudinal direction of the image.

12. The non-transitory computer-readable recording medium storing computer-readable program code of claim 9 that causes a computer to perform extracting, from an image, a target area having a spread centered in a latitudinal direction and a longitudinal direction of the image.

* * * * *